Sept. 27, 1966     E. V. BUNTING     3,275,084

TRACTOR HYDRAULIC CONTROL SYSTEM

Filed Jan. 31, 1964     8 Sheets-Sheet 1

INVENTOR.
ERNEST V. BUNTING
BY
Wolfe, Hubbard, Voit & Osann
ATTORNEYS.

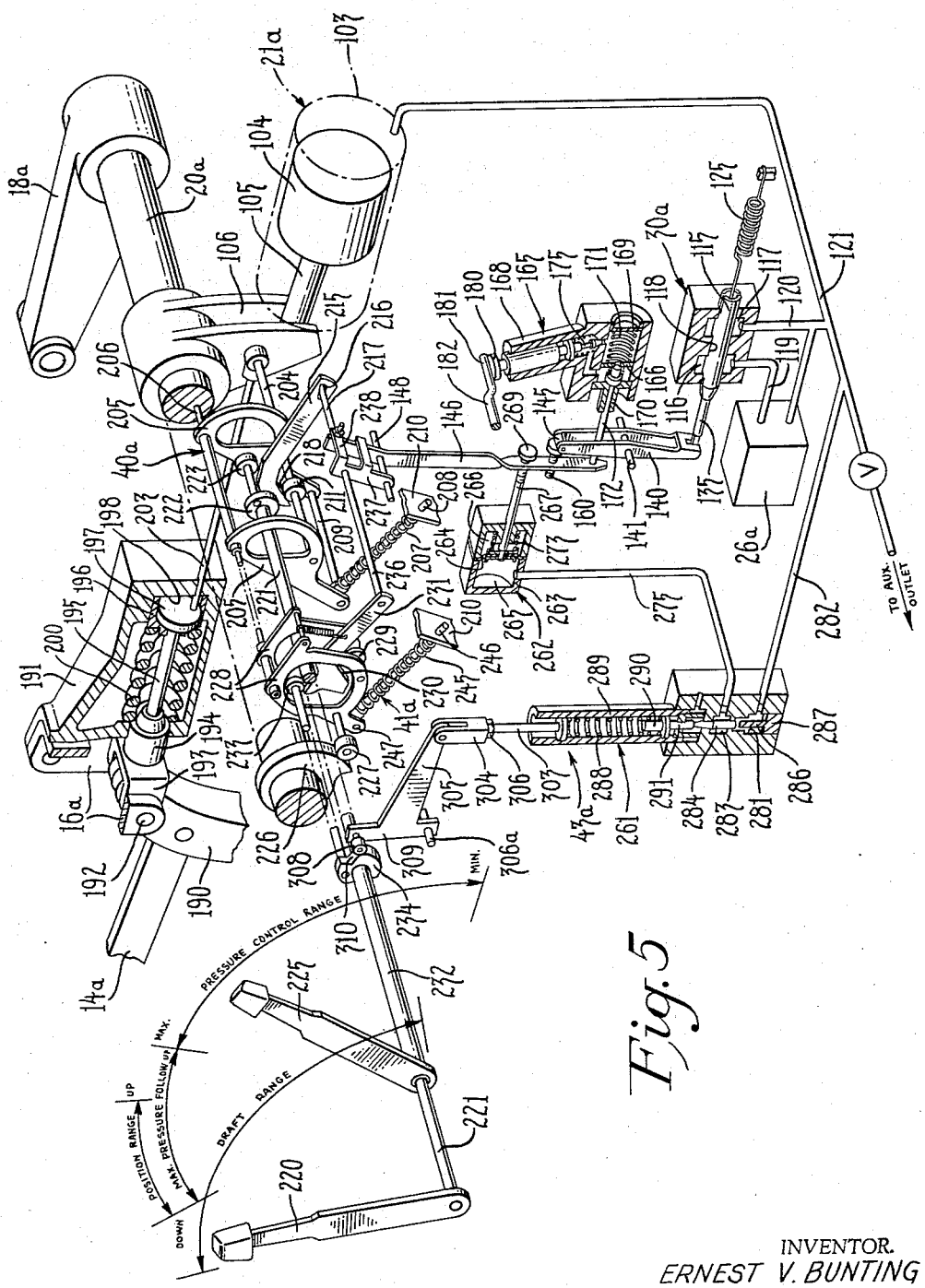

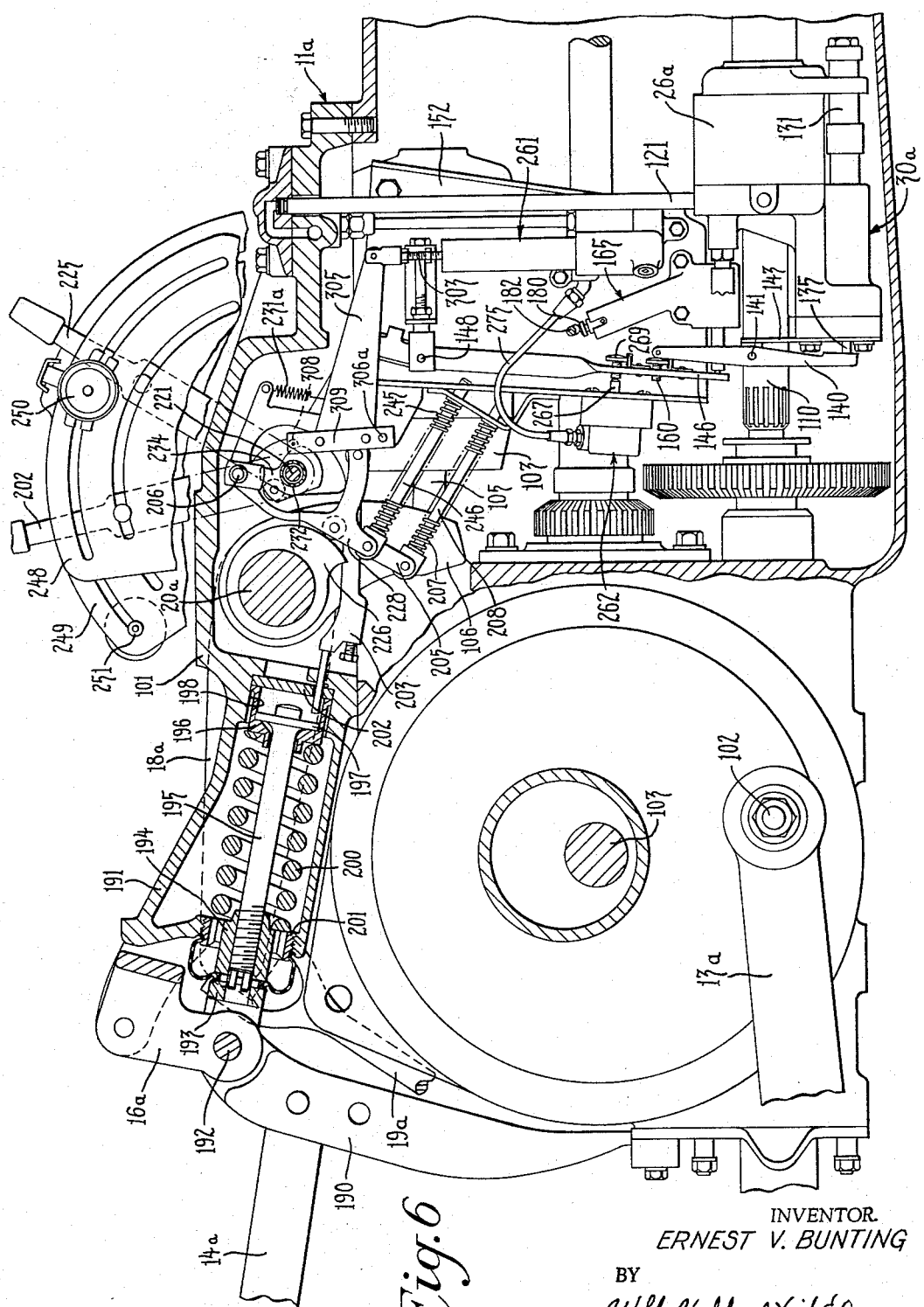

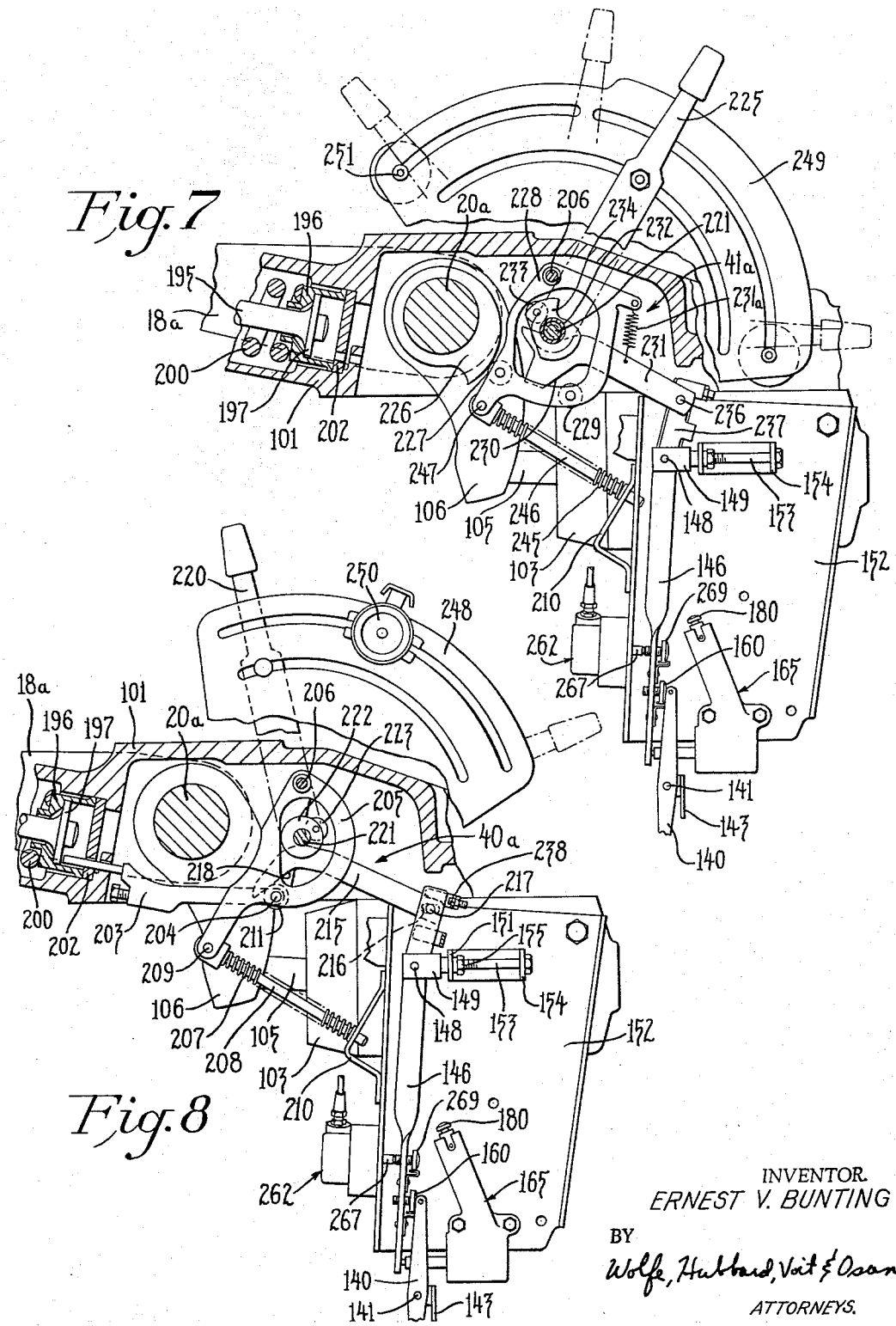

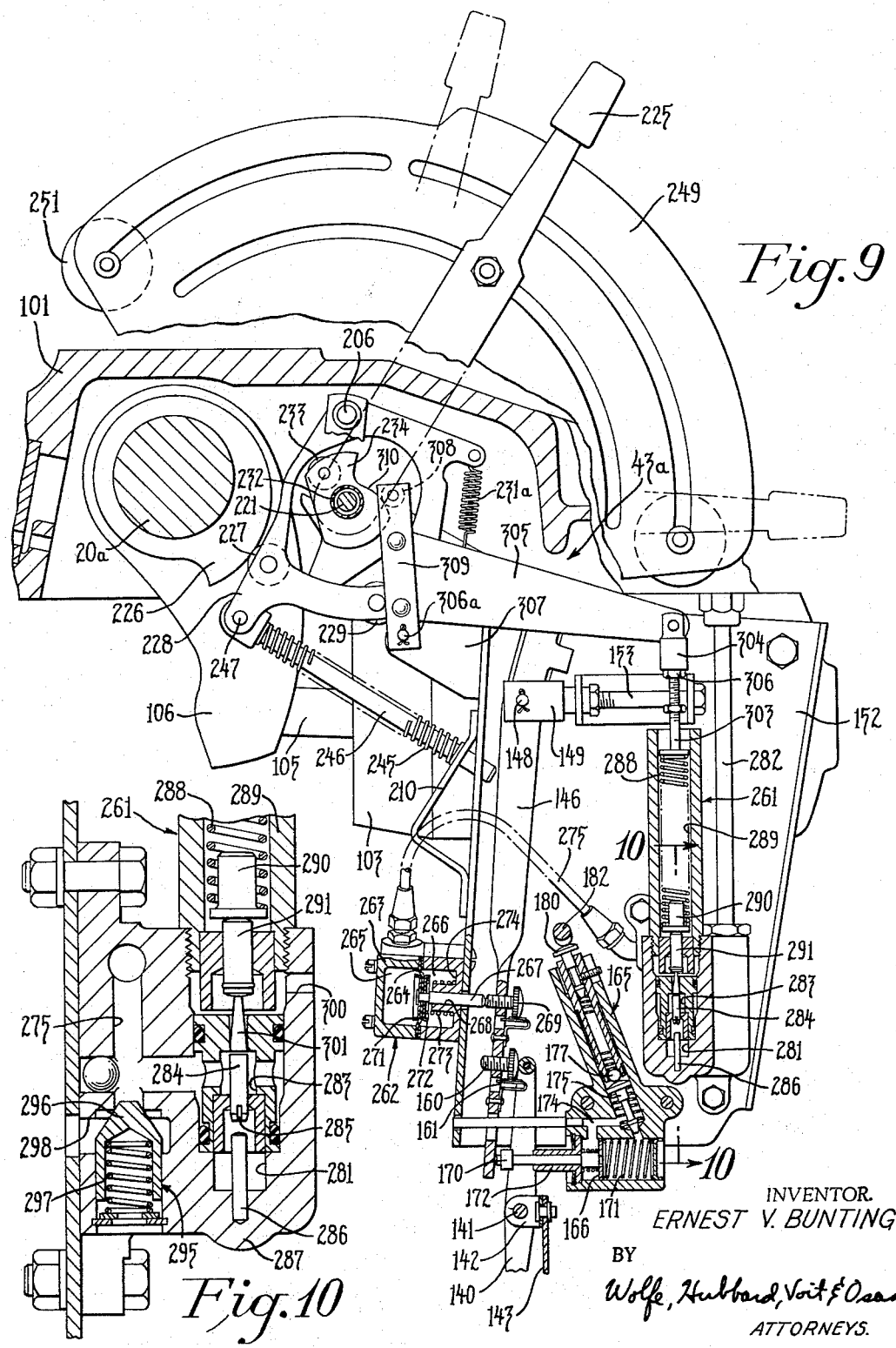

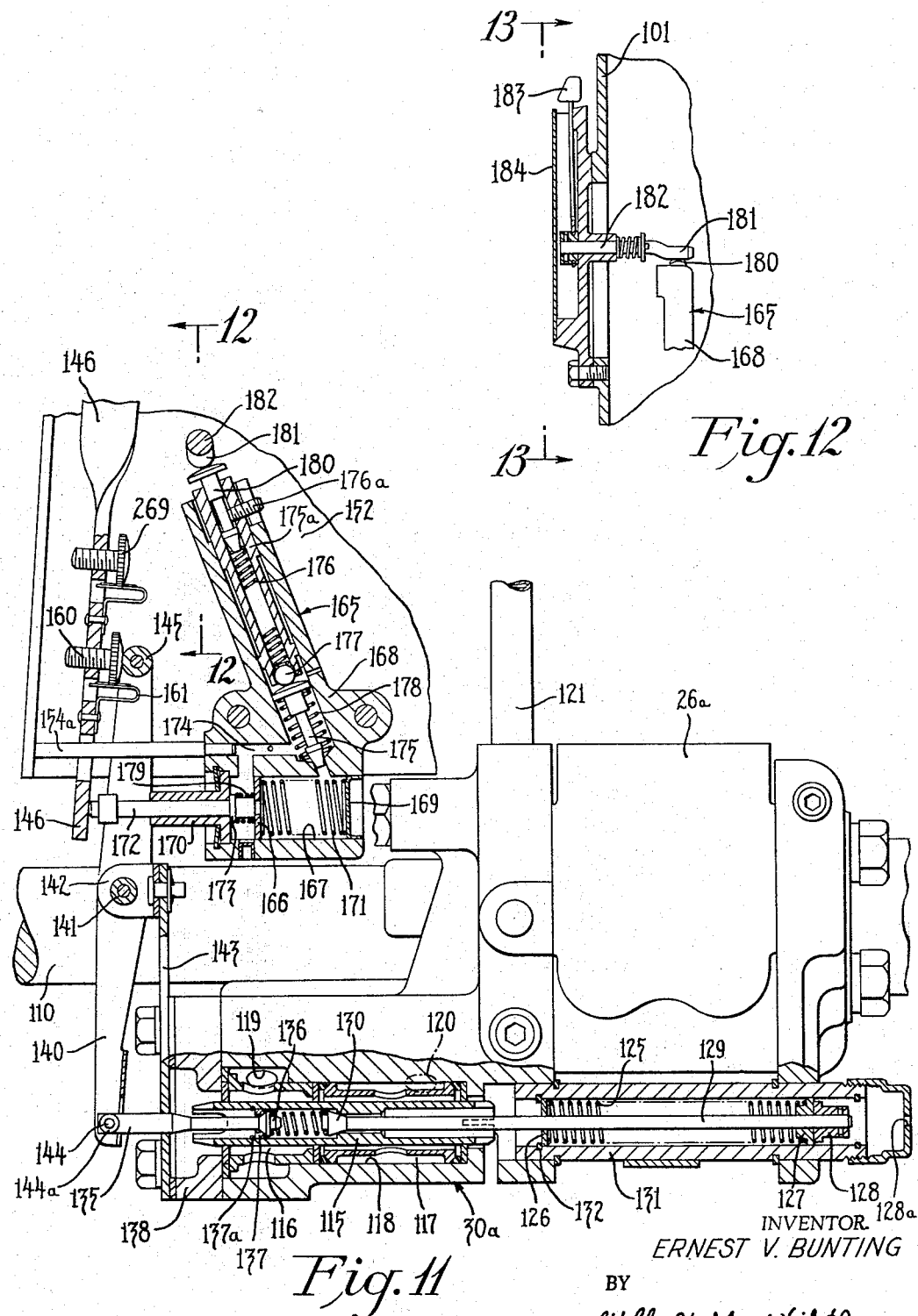

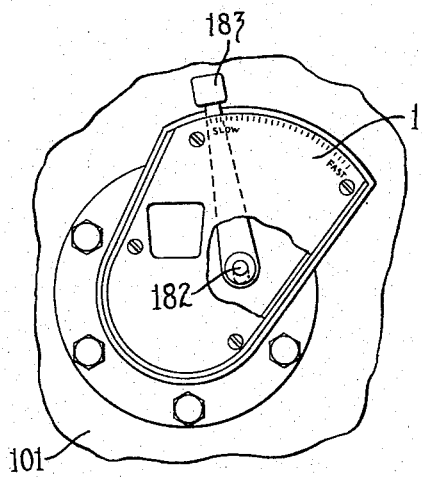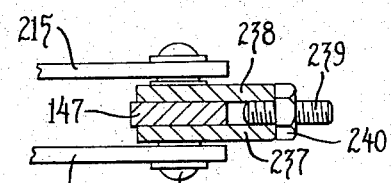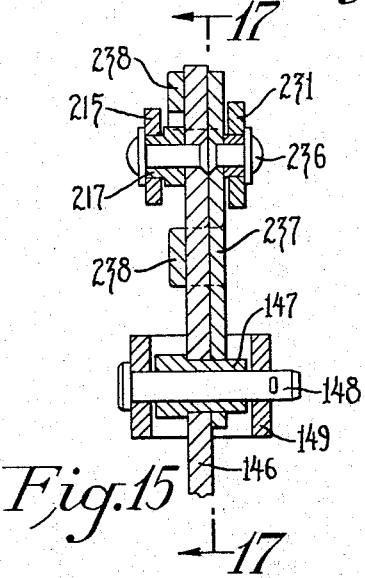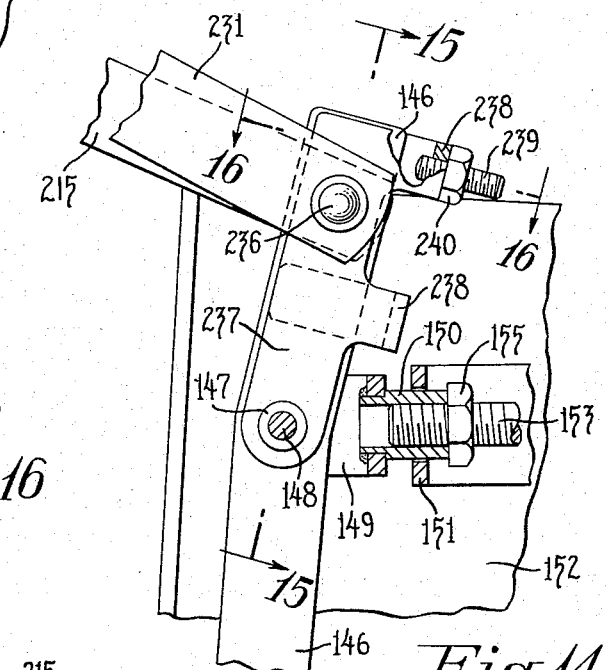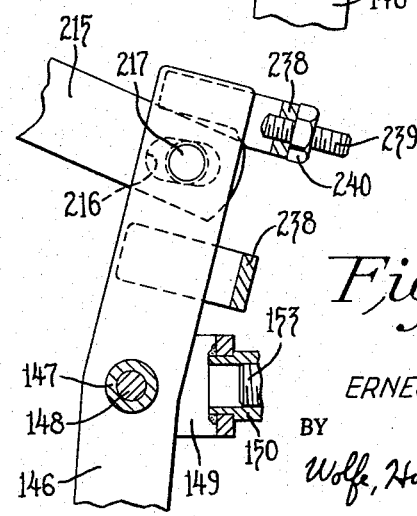

United States Patent Office 3,275,084
Patented Sept. 27, 1966

3,275,084
TRACTOR HYDRAULIC CONTROL SYSTEM
Ernest V. Bunting, Detroit, Mich., assignor to Massey-Ferguson Inc., Detroit, Mich., a corporation of Maryland
Filed Jan. 31, 1964, Ser. No. 341,548
10 Claims. (Cl. 172—9)

This application is a continuation-in-part of my application Serial No. 246,995, filed December 26, 1962, abandoned.

This invention relates to agricultural tractors and concerns, more particularly, a hydraulic control system for tractors of the general type known as "Ferguson system" tractors.

In the basic "Ferguson system," a tractor was provided with hydraulically lifted draft links and with a draft force feedback for controlling the volume of hydraulic pressure fluid in the main lift cylinder of the tractor. Various improvements and refinements have now been made to the basic system including the addition of alternately available modes of operation such as link-position control and hydraulic-pressure control as well as the basic draft control capability. The availability of different modes of operation, of course, inherently complicates the control system and presents the substantial problem of keeping the operator's controls simple, easy to operate and virtually foolproof, without sacrificing operating versatility.

In the past, these improvements in the control system, in large part, at least, simply modified the basic control valve and linkage arrangement in which the control valve was biased toward the fluid exhaust or implement lowering position and compression in the upper link acted through the control linkage in opposition to the valve bias. However, this basic arrangement imposes certain limitations on the more complicated control systems, particularly in regard to the interrelationship of the various control modes and the ability and extent that each of the control functions can take over from the others.

Accordingly, it is the primary object of the present invention to provide an improved hydraulic control arrangement for a tractor hitch linkage that is well suited for versatile, multi-function control modes. More specifically, it is an object to provide such an improved hydraulic control system for a tractor in which a single main control valve is biased toward the fluid supplying or link lifting position and the various control linkages for the different modes of operation are each arranged to act independently on the main valve in opposition to the valve bias, that is, in the fluid discharge or link lowering direction.

Another object is to provide a control system of the above type which can be operated by three separate control functions: draft control, position control and pressure control, arranged so that any one of the functions can override and take over from any other should that be required by the condition of the system or called for by manual operation of the controls.

A further object is to provide a control system as characterized above which readily permits the operator to select and control the amount of weight transferred to the tractor from any type of mounted, semi-mounted, or trailed implement coupled to the tractor. In addition, the control system of the present invention readily permits the setting of a desirable limiting factor on draft control operation such as placing a ceiling on link elevation.

It is also an object to provide a production embodiment of the control system described above which is of reliable, simplified construction to facilitate its manufacture, its initial assembly, and its adjustment.

Other objects and advantages of the invention will become apparent upon reading the following detailed description and upon reference to the drawings, in which:

FIG. 5 is a fragmentary, partially schematic, perspective of a structurally modified control system also embodying the invention;

FIG. 6 is a fragmentary longitudinal section of the upper rear portion of a tractor embodying the control system shown in FIG. 5;

FIGS. 7 and 8 are fragmentary sections corresponding to, and showing portions of the structure otherwise illustrated in FIG. 6;

FIG. 9 is an enlarged fragmentary section showing further details of the pressure control linkage illustrated in FIGS. 6–8;

FIG. 10 is a further enlarged fragmentary section taken approximately along the line 10—10 in FIG. 9;

FIG. 11 is a fragmentary enlarged section showing the lower portion of the structure appearing in FIG. 6;

FIG. 12 is a fragmentary section taken approximately along the line 12—12 in FIG. 11;

FIG. 13 is a fragmentary elevation taken along the line 13—13 of FIG. 12;

FIG. 14 is an enlarged fragmentary section of a portion of the linkage otherwise appearing in FIGS. 6, 7 and 8;

FIGS. 15 and 16 are fragmentary sections taken approximately along the lines 15—15 and 16—16, respectively, in FIG. 14; and FIG. 17 is a fragmentary section taken along the line 17—17 in FIG. 15.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

General Organization

Figure 1:
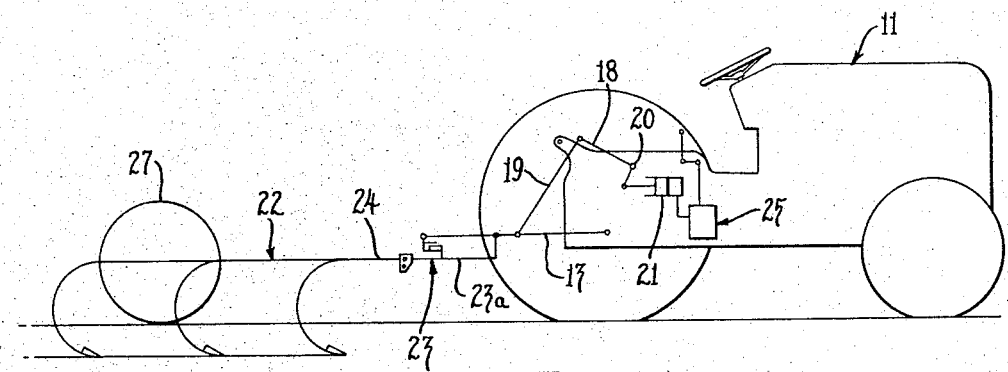
FIGURES 1, 2 and 3 are, respectively, schematic representations of tractor semi-mounted implement, tractor-draft implement and tractor-trailed vehicle combinations which utilize the control system of the present invention.
Figure 2:
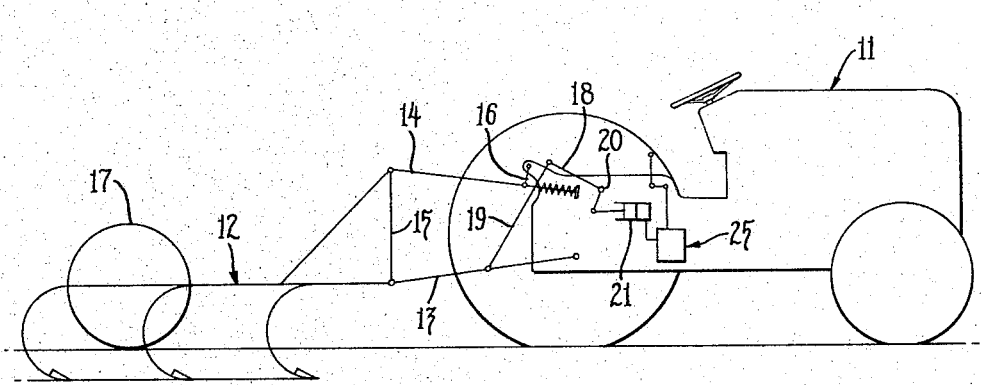
Figure 3:
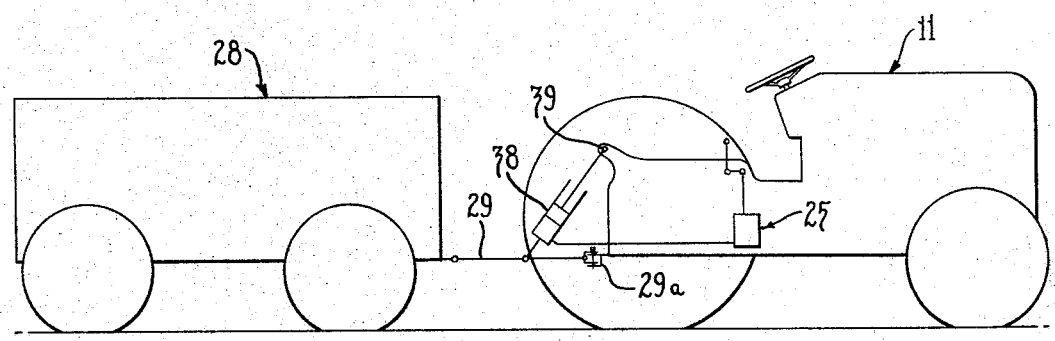

Before turning to a consideration of the details of the improved control system of the invention, it will be helpful to review the three basic tractor-implement coupling arrangements with which the invention is concerned. As shown in FIGURES 1–3, there are, respectively, schematic illustrations of tractor-semi-mounted implement, tractor-draft implement, and tractor-trailed vehicle combinations, each of which utilize the control system of the present invention to permit the tractor operator to selectively transfer a portion of the implement weight to the tractor.

Referring first to FIG. 2, there is shown a tractor-draft implement combination in which a tractor 11 supports a mounted draft implement 12 on a hitch linkage including a draft link 13 and a top control link 14. The draft link is trailingly pivoted on the tractor 11 and releasably coupled to the lower portion of an A-frame 15 forming a portion of the draft implement 12. The control link 14 is floatingly pivoted on the tractor 11 through a rocker 16. As shown here, the implement 12 may be provided with one or more gage wheels 17, although draft implements of this type are usually designed to be fully mounted on the tractor by means of the hitch linkage.

To effect weight transfer from the mounted draft implement 12 to the tractor 11, the tractor includes a lift arm 18 coupled to the draft link 13 through a drop link 19. The lift arm 18 is rigidly secured to a rock shaft 20 which is selectively rotated by a hydraulic actuator or ram 21 under the control of a control system 25. Those familiar with this art will recognize that the tractor-draft implement combination embodies a "Ferguson system" hitch and that such systems use a pair of trailing draft links 13 each coupled by separate drop links 19 to a pair of lifting arms 18 which are secured to the common rock shaft 20, although for convenience only single ones of these elements have been illustrated herein.

In FIGURE 1 there is schematically illustrated a tractor-semi-mounted implement combination in which a semi-mounted implement 22 is coupled to the tractor 11 through a drawbar attachment 23 secured to the trailing ends of the tractor draft links 13. The attachment 23 includes a laterally swingable drawbar 23a adapted to be coupled in rigid alignment to a tongue 24 which projects forwardly from the semi-mounted implement 22. As shown here, the implement 22 also includes ground-engaging wheels 27 (only one of which is shown) to support a portion of the implement weight. For additional details of such a drawbar attachment, reference may be made to Bunting et al. copending application Serial No. 359,076 filed April 13, 1964, and assigned to the same assignee as the present invention.

A controlled portion of the weight of the semi-mounted implement 22 may be selectively transferred to the tractor 11 by raising the tractor lift arm 18. In this case, as the draft links 13 and the drawbar attachment 23 are raised by increasing the volume of pressure fluid in the hydraulic actuator 21, part of the implement weight is transferred to the tractor due to the cantilevered coupling between the drawbar 23a and tongue 24.

The tractor-trailed vehicle combination, schematically illustrated in FIG. 3, includes a four-wheeled wagon 28 or similar vehicle having a pivotally connected drawbar 29 coupled to a rear portion 29a of the tractor frame. To effect transfer of a portion of the wagon's weight to the tractor, an auxiliary actuator 38 is extended from an anchoring point 39 on the tractor to the drawbar 29. In this case, the actuator is arranged so as to shorten upon receiving hydraulic fluid under pressure and thus tends to raise the front of the wagon 28 and thereby transfer a portion of the wagon weight to the tractor 11 in a manner which will be familiar to those skilled in the art.

*Control system outline*

Figure 4:
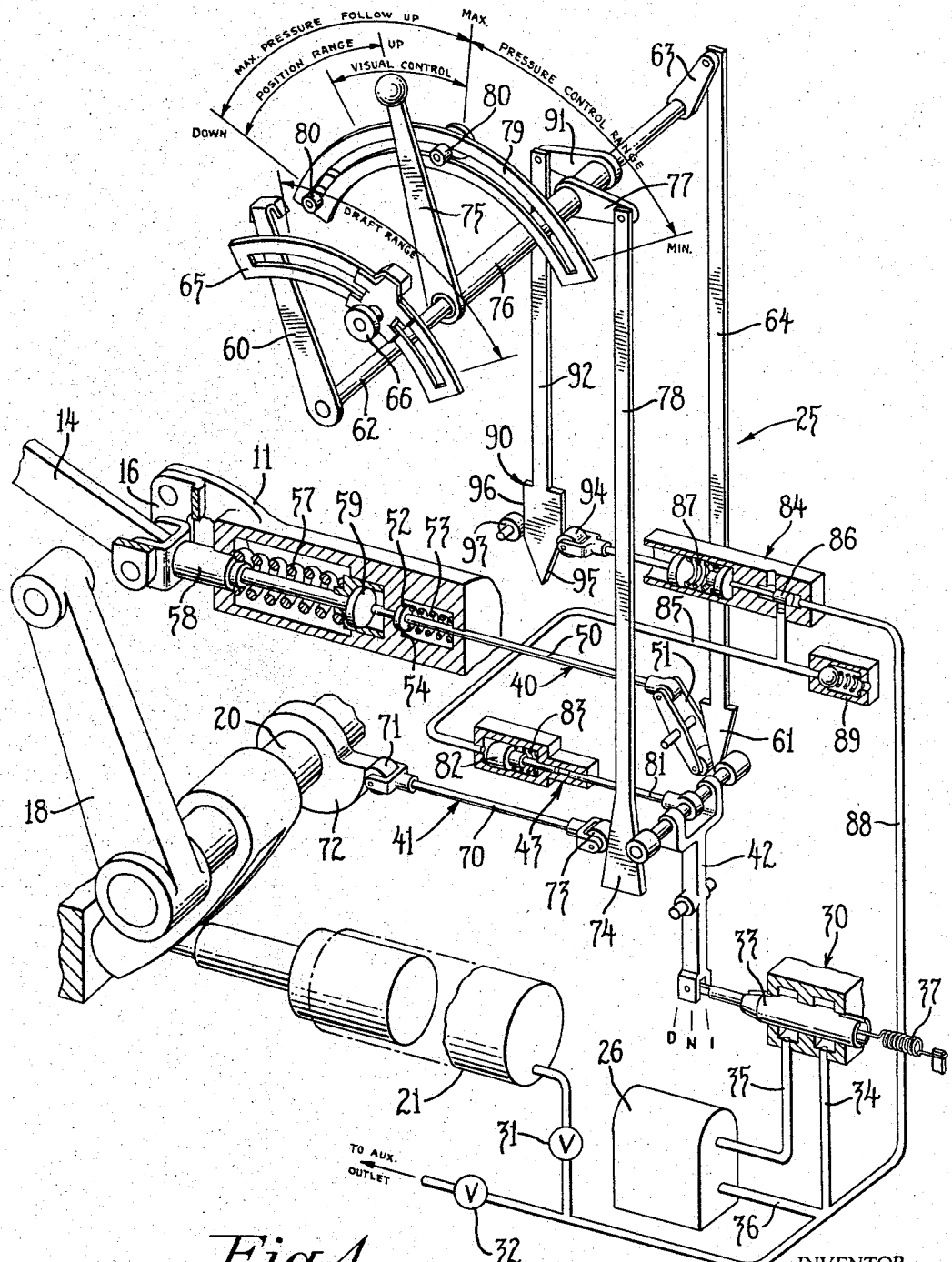
FIG. 4 is a partially diagrammatic perspective of a control system embodying the present invention.

As shown in diagrammatic FIG. 4, the tractor hydraulic control system 25 for controlling the operation of the actuator 21 and the auxiliary actuator 38 includes a positive displacement pump 26 as a source of fluid under pressure. A control valve 30 supplies fluid to, or exhausts fluid from, the actuator 21 through a shut-off valve 31. The shut-off valve 31, together with a second shut-off valve 32, permits the output from the pump 26 to be alternatively directed to the auxiliary actuator 38.

The control valve 30 is of a familiar type in systems of this kind and includes a shiftable spool or valve element 33 positioned on the intake side of the pump 26. The valve 30 has an infinite number of positions ranging from full discharge to full intake with a neutral or locking position in the center of the range. With the element 33 shifted toward the left in FIG. 4, that is, toward the full discharge position, fluid is vented from the actuator 21 through a line 34. When the valve element 33 is shifted toward the right in FIG. 4, or toward the fluid supply or intake position, fluid is admitted through a line 35 to the pump 26 which directs the fluid, under pressure, through a line 36 to the actuator 21.

In keeping with the invention, the valve 30 is biased by a spring 37 toward its fluid supply or intake position and a draft control linkage 40, a position control linkage 41 and a pressure control linkage 43 all act through a control lever 42 on the valve element 33 in opposition to the biasing spring, with each of the linkages 40, 41, 43 embodying a one-way or lost motion connection so that each linkage can take over from, or override the other in moving the valve toward discharge position should that be required by the condition of the system or called for by the tractor operator.

The control linkage 40 is a draft control linkage and it includes a rod 50 which acts on the control lever 42 through a direction reversing lever 51. The rod 50 carries a collar 52 and is biased by a spring 53, which engages the collar, toward a limit position with the collar abutting a wall 54 in the rear housing of the tractor 11. The spring 53 is substantially stronger than the control valve biasing spring 37 so that the spring 53 overcomes the force of the spring 37 and the rod 50 urges, through the levers 51 and 42, the valve 30 toward its discharge position.

The top control link 14, pivoted on the rocker 16, is biased toward a neutral position by a heavy two-way spring 57 that acts on a plunger 58 which is also secured to the rocker 16. Tension in the link 14 causes the plunger 58 to slide toward the left in FIG. 4, compressing the spring 57. Compression in the top control link 14 causes the plunger 58 to move toward the right in FIG. 4, also compressing the spring 57, and causing an enlarged end 59 of the plunger to strike the rod 50 and slide it toward the right. Thus, with a draft implement coupled to the tractor hitch linkage, an increased draft force increases compression in the top link 14 causing the rod 50 to slide to the right and rotate the lever 51 clockwise, whereupon the spring 37 is permitted to shift the valve 30 and the control lever 42 to the valve intake position. This directs additional fluid to the actuator 21, causing the lift arms 18 to be raised and thus lessening the draft load by bringing the implement closer to the surface of the ground. A decreased draft load causes an opposite result. The draft control linkage 40 therefore tends to maintain a constant draft loading in the manner which has become familiar with those skilled in this art.

To permit selection of the draft force to be maintained by the control system, a hand operated draft control lever 60 is coupled to a cam 61 through a shaft 62, an arm 63, and a drop link 64. As is conventional, the draft control lever 60 swings adjacent a quadrant structure 65 carrying a positionable locator 66 which allows the operator to quickly swing the control lever to a preselected position without obstructing the full range of movement of the lever. Swinging of the control lever 60 causes the cam 61 to vary the effective length of the draft control linkage 40 and thus vary the degree of compression in the spring 57, due to either tension or compression forces in the upper link 14, which is required to alter the position of the valve 30. With the control lever 60 in its illustrated full-up position, a friction reducing roller on the lower end of the lever 51 is spaced slightly from the cam 61 due to the spring 53 urging the rod 50 against the end wall 54 and the valve 30 is then under control of the alternate control linkage 41.

Swinging the control lever 60 down, clockwise in FIG. 4, into the "draft range," lowers the cam 61 so as to first swing the control lever 42 in a clockwise direction, thus shifting the valve 30 to its discharge position. This vents fluid from the actuator 21 and causes lowering of the lift arms 18 so that the draft implement 12 coupled to the tractor hitch linkage moves into the ground. As a draft force is developed, the top control link 14 is placed in compression, or reduced tension, against the resistance of the spring 57 and the plunger 58 gradually moves to the right until the rod 50 is engaged and shifted toward the right sufficiently far to rotate the lever 51 and allow the spring 37 to shift the valve 30, and swing the control lever 42 back to their neutral positions. It will, of course, be seen that the further forward the draft control lever 60 is swung, the greater is the compressive force required in the top link 14 to restore the control valve 30 to neutral, and, hence, the setting of the lever 60 dictates the draft load that is maintained by the control system.

The control linkage 41 is a position control linkage and it includes a rod 70 having a cam follower 71 at one end which rides on a spiral cam 72 that is secured to the rock shaft 20. The opposite end of the rod 70 carries a cam follower 73 which acts on the control lever 42 through a vertically positionable cam 74. The linkage 41 thus acts as a position feedback linkage relating the angular position of the rock shaft 20, and thus the elevation of the hitch linkage, to the operation of the control valve 30. If the control lever 42 is rocked clockwise, again as seen in FIG. 4, so as to shift the valve 30 toward its discharge position, fluid is exhausted from the actuator 21 and the rock shaft 20 turns in a counterclockwise direction to shift the rod 70 toward the left, thereby restoring the control lever 42, and hence the valve 30 to their neutral positions under the bias of the spring 37.

To permit selection of a desired vertical position of the hitch lift arms 18, a hand operated position lever 75 is coupled to the cam 74 through a sleeve 76, an arm 77, and a drop link 78. The lever 75 swings adjacent a quadrant segment 79 having a pair of adjustable stops 80. The lever is shown in its full-up, transport position wherein the rod 70 must be urged as far as is possible to the right in FIG. 4 by the highest point on the cam 72 to hold the valve 30 in its neutral position. In other words, the valve 30 has been brought to the neutral position with the lift arm 18 in its fully raised, transport position. Swinging the lever 75 rearwardly, counterclockwise in FIG. 4, from its straight-up transport position through the "position range" lifts the cam 74 so as to first cause the control lever 42 to rock clockwise thereby shifting the valve 30 to its discharge position. This vents fluid from the actuator 21 and causes the lift arm 18 to be lowered and the rock shaft 20 to rotate counterclockwise. The cam 72 thus allows the rod 70 to gradually shift toward the left in FIG. 4 so that the spring 37 can again move the valve 30 to its neutral position, with the rock shaft 20 occupying the position selected by the positioning of the lever 75. The lever 75 thus provides, through the "position range," direct vertical position control for the tractor hitch linkage.

The pressure control linkage 43 includes a rod 81 secured to the upper end of the control lever 42 and acted on by a piston 82 biased toward the left in FIG. 4 by a spring 83. A pressure control valve 84 controls hydraulic pressure exerted on the piston 82 through a line 85 and it can be seen that an increase in pressure in the line 85 which is sufficient to overcome the force of the spring 83 shifts the rod 81 toward the right in FIG. 4 so as to rock the control lever 42 in the valve discharge direction.

The pressure control valve 84 includes a valve element 86 which is normally held by a spring 87 in its illustrated position blocking the line 85. The pressure developed by the pump 26 acts on the valve element 86 through a line 88 and, when this pressure exceeds the force of the spring 87, the element 86 shifts to the left in FIG. 4 placing the line 88 in communication with the line 85 and thereby allowing the high pressure fluid to shift the piston 82 to the right as in FIG. 4 which causes the rod 81 to rotate the control lever clockwise. The piston 82 reaches the end of its stroke when the valve 30 is brought to the neutral position thereby terminating the flow of hydraulic pressure fluid from the pump 26 which caused opening of the pressure control valve 84. Pressure in the line 85 which is in excess of that required to operate the piston 82 is vented through a pressure relief valve 89.

To select the pressure level at which the valve 84 will open and cause the control valve 30 to be shifted toward its discharge position, the hand operated lever 75 controls a cam 90 through the sleeve 76, an arm 91 and a drop link 92. The cam 90 functions between a fixed abutment roller 93 and an axially shiftable member 94 which serves to compress the spring 87. When the lever 75 is swung forwardly, that is, clockwise in FIG. 4, a tapered portion 95 of the cam 90 allows the member 94 to shift toward the left in FIG. 4 and thus reduce the force exerted by the spring 87 on the valve element 86. With the lever 75 in its limit position opposite to the position range, a minimum pressure in the line 88 is effective to shift the element 86 and operate the pressure control linkage 43. The pressure at which the linkage 43 is operated can be varied by positioning the lever 75 through its pressure control range.

It can thus be seen that both position control and pressure control is obtained by the single operation lever 75. The position control range extends from one limit position to the straight-up, transport position of the lever 75. Pressure control is obtained from the opposite limit position through the pressure control range. With the lever 75 swung beyond the maximum pressure point and into the position range, a straight portion 96 of the cam 90 maintains the spring 87 at its maximum degree of compression so as to hold the pressure setting at its maximum level.

It will also be noted that the lever 75 has an intermediate position or range between the full-up, transport position and the maximum pressure position wherein the control valve 30 is directly controlled by lever 75 and is unaffected by the position control linkage 41 since the rod 70 cannot shift further to the right in FIG. 4 after the ram arm is stopped by the fixed member. In this range the control valve 30 is also unaffected by the pressure control linkage 43, unless of course the maximum pressure allowable in the system by the pressure control valve 84 is exceeded. In this range the valve 30 is directly moved between neutral and full intake with the degree of intake opening being dependent on the position of lever 75. With the lever 75 forward of the position shown in FIG. 4, the pump 26 will continue to supply fluid to the cylinder 21 or the auxiliary outlet until the pressure therein rises to the maximum pressure allowed by the pressure control valve 84 which will act to move the valve 30 to neutral and allow excess pressure to be relieved through relief valve 89.

The various operating features and advantages of the disclosed hydraulic control system can now be appreciated. With a draft implement hitched to the tractor linkage, the desired amount of draft load can be set by positioning the draft control lever 60. At the same time, the tractor operator can position the lever 75 so as to limit the system to a desired pressure level or to a desired linkage height by shifting the lever 75 into either the pressure control range or the position range.

It can be readily seen that both the position control linkage 41 and the pressure control linkage 43 can take over from the draft control 40 should the control setting and operating conditions call one or the other of these linkages into play. Thus, when the operator reaches the end of a field and desires to elevate the draft implement, he simply swings the draft control lever 60 to its straight-up position, whereupon control of the valve 30 passes to the position control linkage 41 with the result that the lift arm 18 is swung upwardly to a point dictated by the previous setting of the lever 75. If the pressure control linkage is set for a pressure insufficient to lift the implement out of the ground it may be necessary to increase the pressure setting to allow the implement to rise. When he wishes to resume work, the operator moves the draft control lever 60 to the desired draft, a point which may be located on the quadrant 65 by the locator 66, and the draft linkage 40 will take over operation of the control valve 30.

By placing the draft control lever 60 in its full-up position, the vertical position of the hitch links can be automatically set by moving the lever 75 into its position range. At all times the pressure control linkage 43 can override or take over from the position control linkage 41 so that the maximum pressure can never be exceeded to damage the system.

When employing an auxiliary cylinder such as the cylinder 38, the valve 31 is closed to hold the lift arm 18 in position and the valve 32 opened so that pressure is directed to an auxiliary cylinder or other fluid operated member. The lever 75 can then be put between the position and pressure control range and the draft control lever 60 used for direct visual control of the operation of the auxiliary cylinder. There the maximum pumping rate can be controlled by positioning the lever 75 at a selected point between the transport position and the maximum pressure position. Alternatively, the lever 75 can be swung to a desired point in the pressure control range so as to limit the pressure developed in the auxiliary actuator 38 when under control of the draft control lever 60.

The control system of the present invention is also particularly well suited to control weight transfer from either the tractor-implement combinations shown in FIG. 1 wherein the semi-mounted implement 22 is partially supported by a ground wheel 27, or in the tractor-trailed vehicle combination shown in FIG. 3 in which the vehicle 28 is hitched to the tractor through a pivoted drawbar 29, as well as the more conventional tractor-draft implement combination shown in FIG. 2 which has been discussed above.

When using the inventive control system in the tractor-semi-mounted implement combination shown in FIG. 1, with the valve 31 open and the valve 32 closed, the draft control lever 60 may be positioned in the straight-up, inactive position and the stops 80 located so as to limit the operation lever 75 to a range of movement extending from the straight-up transport position to a point within the pressure control range. As so adjusted, a maximum amount of weight transfer would take place with the lever located to the right of the position shown in FIG. 4. By swinging the lever in a clockwise direction, or even further to the right, as seen in FIG. 4, the control system can be conditioned for lessening the amount of weight transferred from the implement to the tractor by reducing the setting at which the pressure control valve 84 causes the control valve 30 to reduce the force exerted by the actuator 28.

When employing the control system of the invention in the tractor-trailed vehicle combination shown in FIG. 3, the valve 31 is of course closed and the valve 32 opened so as to direct fluid from the pump 26 to the auxiliary actuator 38. Under these conditions, the draft control lever 60 can be positioned in the straight-up, inactive position and the stops 80 arranged on the quadrant 79 so as to limit movement of the operation lever 75 to a portion of the pressure control range so that the amount of force developed in the auxiliary actuator 38 is kept to a safe limit and yet is variable within that limit to regulate the degree of weight transfer from the wagon 28 to the tractor 11.

In summary, it will now be understood that the control valve 30 in the system 25 is biased by the spring 37 in an intake or link lifting direction so that the spring tends to keep the hitch linkage in transport position. The linkages 40, 41, 43 with their control levers 60, 75 can each take over, one from the other, in a fluid exhausting or link lowering direction. As a further practical advantage of the control system 25, the true one-lever control of a draft implement which is attained makes it unnecessary for a tractor operator to misuse his control system in order to obtain a form of one-lever control, as was often the case with prior commercial forms of tractor hydraulic control systems.

Production embodiment

An embodiment of the invention well suited for commercial production is shown in FIG. 5 et seq. in which parts corresponding directly to those previously described have been given the same reference numerals with the distinguishing suffix "a" added. Of course, a large number of elements in this embodiment correspond functionally to those shown in FIGS. 1–4, but, for clarity, only certain elements having direct structural similarity have been designated with the "a" suffix convention.

Considering first FIGS. 5 and 6, there is shown a portion of a tractor 11a having a rear housing 101 which, together with a gear box and an engine, constitute the backbone of a frameless tractor body. The tractor 11a is provided with a hitch linkage that includes a pair of draft links 13a and an upper or control link 14a. The draft links 13a are arranged in trailing relation to the tractor and converge forwardly with their forward ends pivoted as at 102 on the tractor housing 101 to swing vertically about a horizontal axis located below and slightly forward of the axle 103 for the tractor drive wheels. The pivots 102 customarily permit some lateral swing of the draft links 13a, as well as vertical swinging movements utilized for raising and lowering the implement coupled to the hitch.

Hydraulic power mechanism

Raising and lowering of the draft links 13a is effected through the medium of a hydraulic power mechanism that is driven from the tractor engine. In the illustrated construction, the power mechanism includes a hydraulic actuator 21a in the form of a one-way ram comprising a cylinder 103 fixed to the housing 101 and mounted with its open end facing rearwardly and receiving a piston 104. A piston rod 105 extends from the piston 104 and is connected by a ball-and-socket joint with a crank arm 106 splined to a rock shaft 20a journalled in the housing 101. The laterally projecting ends of the rock shaft 20a are fitted with lift arms 18α that are connected by drop links 19a with the respective draft links 13a. The arrangement is such that when pressure fluid is supplied to the closed end of the cylinder 103, the piston 104 is forced rearwardly to rock the shaft 20a in a direction to raise the draft links 13a. Conversely, upon exhaust of fluid from the cylinder 103, the piston is permitted to retreat into the cylinder under the urging of a gravity load on the links 13a so that the links swing downwardly in a lowering direction.

Pressure fluid is supplied to the actuator 21a from a positive displacement pump 26a located in the housing 101 below the actuator. The housing constitutes a sump or reservoir for the oil or other fluid used by the hydraulic system and the pump 26a is customarily submerged in the oil supply. The supply of fluid to the actuator 21a, and exhaust of fluid therefrom, is controlled by a main control valve 30a that is arranged to meter fluid flow to the pump intake and to control lowering of the draft links by opening and closing an outlet port through which the pump delivery may be by-passed and fluid exhausted from the actuator 21a.

As is conventional, the pump 26a is driven through a pump and PTO shaft 110 independently of the change speed transmission of the tractor.

Control valve mechanism

The control valve 30a includes a plunger 115 slidable axially through a pair of alined valve chambers including a low pressure inlet chamber 116 and a high pressure outlet chamber 117 formed by an assembly of rings and sleeves within a bore 118 in the housing of the pump 26a. The pump inlet is in communication with the chamber 116 through an inlet passage 119. The pump outlet communicates with the chamber 117 through a passage 120 and is also connected with the actuator 21a by a supply conduit 121.

The plunger 115 is dimensioned so that when in a neutral position it effectively blocks both the inlet chamber 116 and the outlet chamber 117 from the sump. As a result, entry of oil to the pump inlet is prevented and exhaust of fluid from the actuator is blocked so that the fluid is locked in the system and the actuator piston 104 remains stationary. As the plunger 115 is shifted forwardly, that is to the right as seen in FIG. 11, the tapered and slotted rear end gradually opens the chamber 116 to the sump allowing the pump to draw in fluid and deliver it under pressure. Under such conditions, the plunger 115 continues to block the chamber 117 from the sump and consequently the pressure fluid delivered by the pump is supplied to the actuator 21a to move the piston 104 rearwardly and raise the hitch linkage through the rock shaft 20a as described above.

Shifting of the valve plunger 115 in the opposite direction, toward the rear of the tractor, opens the high pressure chamber 117 to the sump while maintaining the inlet chamber 116 blocked so that no fluid can enter the pump. Fluid delivery ceases and the fluid in the actuator cylinder 103 is permitted to exhaust to the sump under the pressure exerted on the piston 104 by the weight of the hitch and the implement attached to it. As is conventional, the forward end portion of the plunger 115 is chamfered and slotted to provide for precise metering of the fluid exhaust from the actuator 21a and thus accurate regulation of the hitch linkage lowering.

In keeping with the invention, the plunger 115 is biased toward its intake position or to the right as seen in FIG. 11. Such biasing is affected by a helical compression spring 125 interposed between a stationary abutment 126 and a collar 127 abutting a head 128 fixed to the outer end of a rod 129 operatively connected with the plunger 115. The rod 129 extends axially into the plunger 115 and the operative connection is provided by a tapered head 130 on the rod that is fitted into a complementary socket formed in the central portion of the plunger, the head and socket preferably being non-circular to prevent relative rotation of the parts. The outer end of the rod and the compression spring 125 are enclosed in a tubular housing 131 rotatably mounted in the pump body in axial alignment with the valve bore 118. A snap ring 132 in the inner wall of the housing 131 holds the abutment 126 stationary.

For shifting the valve plunger 115 against the bias of the spring 125 toward the fluid exhaust or link lowering position, a valve actuating rod 135 is fitted into the rearward end of the plunger and provided with a semi-cylindrical head 136 that engages a complementary, forwardly facing socket formed in an abutment member 137 held by snap ring 137A within the plunger 115. The valve rod 135 extends rearwardly through an aperture in the member 143 for connection with the valve actuating mechanism including the controls for obtaining draft control, position control, and pressure control of the hydraulic system. It should be noted that the movement of the valve is dampened by flow of oil through the orifice 128A at the right end of the housing 131.

*Valve actuating mechanism*

The valve actuating mechanism of this embodiment includes a draft control linkage 40a, a position control linkage 41a, a pressure control linkage 43a, and linkage parts which are common to all three controls. The common part of the linkage includes a first valve lever 140 pivoted intermediate its ends by a sleeve-like bushing 141 that is supported on a bracket 142 carried by a support plate 143 rigidly mounted on, and extended upwardly from, the rear end of the housing of the valve 30a. The upper end of the lever 140 is bifurcated and arranged to straddle the bracket 142. At its lower end, the lever 140 is slotted to receive the projecting end of the valve actuating rod 135 which carries rollers 144A on pin 144 that engage the lever so that the rod, and with it the valve plunger 115, are pulled toward the left or fluid exhaust position against the bias of the spring 125 when the lever 140 is rocked clockwise as shown in the drawings.

At its upper end, the lever 140 carries an abutment roller 145 through which valve actuating movements are received from a second valve lever 146. The lever 146, in the illustrated construction, is in the form of an elongated flat bar having its upper portion disposed edgewise in a fore-and-aft direction and having its lower end twisted relative thereto through an angle of ninety degrees. Adjacent its upper end, the lever 146 is pivotally mounted on a sleeve 147 (see FIGS. 14–17) secured by a pin 148 in a yoke 149 supported for adjusting movement transversely of the axis of the pivot. For this purpose, the yoke 149 has a tubular shank 150 slidably supported in an opening in a bracket ear 151 on an upright support plate 152 secured in depending relation from the actuator 21a.

The shank 150 of the yoke 149 is threaded to receive an adjusting bolt 153 which extends through a second bracket ear 154 (FIGS. 6–8) on the plate 152 that is spaced from the ear 151 with the head of the bolt 153 abutting the forward side of the ear 154. The yoke 149 is prevented from rotation by the pin 154A which passes through a slot in the lower end of lever 146 and, accordingly, the shank and the yoke 149 may be shifted forwardly or rearwardly by rotation of the bolt. A lock nut 154 threaded on the bolt and engageable with the forward end of the shank 150 provides for locking the parts in adjusted position.

Adjacent its lower end, the lever 146 carries a contact element in the form of a large headed screw 160 (FIGS. 5, 6 and 11) engageable with the abutment roller 145 of the first valve lever 140. By screwing the contact element in or out, the relationship between the two levers 140, 146 can be adjusted and such adjustment is retained by means of a spring detent 161 mounted on the lever 146 and positioned to engage the serrated edge of the head of the screw 160.

The lower end of the lever 146 is also positioned to cooperate with a dashpot device 165 (see FIG. 11) adapted to restrict the speed at which the lever 146 can swing in a counterclockwise direction to shift the main valve plunger 115 toward its exhaust position. The device 165 includes a piston 166, having a central opening, which floats in a cylinder 167 bored in a housing 168 that is secured to the lower end of the support plate 152. The ends of the cylinder 167 are closed, respectively, by a plug 169 and a collar 170. The piston 166 is urged by a compression spring 171 seated on the plug 169 against a plunger 172 that slides freely in the collar 170 in contact with the lever 146. The spring 171, in holding the piston 166 against the plunger 172, causes the end of the plunger to close the central opening in the piston and moves the parts to the left in FIG. 11 until a stop 173 engages the collar 170.

The ends of the cylinder 167 are interconnected by a passage 174 and both the cylinder 167 and the passage 174 are filled with oil. Movement of the piston 166 to the right in FIG. 7 is restricted or dampened since oil on the right side of the piston must pass an orifice valve element 175 restricting the passage 174. The dampening or restricting effect on movement of the piston 166 to the right limits the rate at which the plunger 172, and, hence, the lever 146, can be shifted to turn the lever clockwise and slide the main valve plunger 115 in its exhaust direction. The dashpot device 165 thus limits the suddenness with which the fluid can be exhausted from the actuator 21a and the hitch linkage dropped.

Return movement of the piston 166, toward the left in FIG. 7 is unrestricted since the pressure of oil at atmosphere pressure acting on the left side of piston 166 in combination with the force of spring 179 is sufficient to overcome the force of spring 171 and the subatmosphere pressure in the expanding chamber 167 on the right side of piston 166 to hold the piston 166 away from plunger 172. This allows oil to flow freely through the piston 166 and the plunger 172 can follow the movement of lever 146 to the left. When movement of the lever 146 halts, the plunger 172 is arrested and the stronger spring 171 and now normal pressure in the chamber 167 overcomes the force of the spring 179 and seats the piston 166 against the end of the plunger 172 so as to close the central opening in the piston. This conditions the parts for again restricting movement of the lever 146 toward the right in FIG. 7.

The position of valve element 175 and hence restriction of flow through passage 174 is determined by the position of an adjustable length assembly including a sleeve 175A, a slidable stop 180 biased by a spring 176 and held in position by a set screw 176A and ball 177 fixed in the end of sleeve 175A. The valve element 175 is biased by a spring 178 against this assembly, whose length is initially adjusted by loosening set screw 176A. The assembly and valve element 175 is moved by an eccentric 181 on a shaft 182. The shaft 182 is pivoted in a plate closing or opening in the tractor housing 101 (see FIG. 12) and carries, at its outer end, a finger lever 183 (see also FIG. 13) which is adapted to swing adjacent a scale 184 that facilitates adjustment of the angular position of the shaft 182 and, hence, the position of the shaft eccentric portion 181 with relation to the movable stop 180. The lever 183 thus permits setting of the valve element 175 and this, as explained above, permits selection of the extent of the dashpot effect exerted by the device 175.

*Draft control*

To achieve automatic draft control, soil reaction on an implement is measured by a control spring assembly on the tractor to which the top link 14a of the hitch is connected, in this instance through the medium of a lever 190 (see particularly FIG. 6). The control spring assembly is enclosed in a hollow extension 191 of the housing 101 located rearwardly of the rock shaft 20a. Pivotally suspended from the rear of the extension 191 is a rocker 16a connected by a pin 192 with the upper end of the lever 190 and with a yoke 193 which has a centrally apertured head 194 projecting into the extension 191 (see also FIG. 5). Threaded into the head is a control plunger 195 that extends forwardly through the end wall of a cup member 196 and terminates in a rigid collar 197 slidable axially within the cup. The cup, in turn, is slidable axially in a bore 198 formed in a transverse web of the housing 101.

A heavy coil spring 200 encircles the plunger 195 and bears at one end against the end wall of the cup 196 and at the other end against either a stop sleeve 201 threaded into the rear of the extension 191 or the end face of the head 194. The arrangement is such that under tension loads applied to the top link 14a, the spring 200 is compressed between the cup 196 and the stop 201. Under tension load the cup may be drawn rearwardly in the bore 198. When the tension load is relaxed, the spring 200 expands until the cup seats against a closure plate 202 closing the inner end of the bore 198. When compression is applied to the top link, the head 194 forces the spring 200 away from the sleeve 201 and the plunger advances, moving the collar 197 forwardly in the cup 196. The control spring 200 is thus compressed when either a tension or compression load is imposed in the top link 14a.

The reciprocating motions of the control plunger 195 are transmitted to the control system through a pushrod 203 having one end projecting through an aperture in the closure plate 202 for engagement by the collar 197. The end of the rod also extends through, and is guided in, an aperture in the web of the housing 101 adjacent the end of a cup receiving bore 198.

At its inner end, the pushrod 203 is connected by a pivot pin 204 to a pair of rocker plates 205 that are spaced laterally adjacent the end of the rod 203 and suspended on a pivot pin 206 mounted in the housing 101. The rocker plates 205 are yieldably urged in a direction to hold the pushrod 203 in engagement with the collar 197 by a coiled compression spring 207 encircling a guide rod 208. As seen in FIG. 6 an adjustable stop bolt limits movement of the pushrod 203 to the left. One end of the rod 208 is pivotally connected by a pin 209 to the projecting lower ends of the rocker plates 205 and the other end is received in and guided by an aperture in an angularly disposed bracket 210 carried on a transverse flange extending along the rear edge of the support plate 152. The spring 207 thus acts between the stationary bracket 210 and the rear portion of the rod 208 to urge the rod rearwardly, and thus the spring supplies the desired bias to the rocker plates 205 and the pushrod 203.

For operating the valve 30a, the rocker plates 205 carry between them a follower roller 211 which, in the illustrated construction, is rotatably supported on the pin 204. The follower roller cooperates with a cam element 215 which is formed with a slot 216 at its forward end that embraces a sleeve 217 rotatably anchored to the upper end of the lever 146 (see also FIGS. 15 and 17). At its opposite end, the cam element 215 is formed with a substantially flat, downwardly depending cam surface 218 (see FIG. 8) adapted to ride on the roller 211 and disposed at an angle to the path described by the roller as the rocker plates 205 are swung on their pivot pin 206 in response to the urging of the draft responsive mechanism.

If not restricted, the cam element 215 simply swings freely on its pivot sleeve 217 and no movement is imparted to the valve lever 146 as the follower roller 211 moves back and forth. Selective restrictions of such free pivotal movement of the cam element, and the conditioning of that element for imparting valve actuating movement to the valve lever, is a function of a draft control quadrant lever 220. The draft control lever 220 is fixed to the outer end of a shaft 221 journalled on and extending into the interior of the housing 101. The inner end of the shaft 221 extends through the rocker plates 205 and overlies the cam element 215. The inner portions of the rocker plates are cut away to accommodate the shaft.

A support collar 222 fixed to the shaft 221 carries a cam engaging element in the form of a roller 223 in eccentric relation to the axis of the shaft and in position to engage the upper edge of the cam element 215. The angular disposition of the roller 223 with respect to the shaft 221 is such that with the draft control lever 220 in its upper or "raise" position, the cam element 215 is left free for pivotal movement by the follower 211 through the entire range of movement of that roller by the draft responsive means. However, as the draft control lever 220 is swung forwardly, clockwise toward the position shown in dashed lines in FIG. 8, the cam element 215 is pushed down progressively against the cam follower roller 211. Due to the inclination of the cam surface 218, the cam element 215 is thus shifted bodily rearwardly swinging the valve lever 146 counterclockwise with the result that the main valve plunger 115 is moved to the left in FIG. 11 and toward the exhaust or drop position. This results in a lowering of the hitch linkage until the valve plunger is restored to its neutral position by appropriate movement of the cam follower roller 211 under the urging of the draft responsive plunger 195 and the follower rod 203. In effect, the movement of the draft control lever 220 forwardly from its uppermost position conditions the draft control linkage 40a for transmitting movement from the draft responsive mechanism to the control valve 30a. Furthermore, it adjusts the effective length of this linkage in accordance with the extent of the displacement of the lever 220 from its neutral position.

When the draft control lever 220 is swung back into its neutral or upper position, the main valve plunger 115 is shifted back to its "raise" or intake position by the biasing spring 125, resulting in lifting of the hitch and the attached implement to its uppermost or transport position.

*Position control*

The position control linkage 41a affects shifting of the main valve plunger 115 under the joint control of a position control lever 225 and a cam 226 mounted on and rotatable with the rock shaft 20a (see FIGS. 5 and 7). The cam 226 coacts with a follower roller 227 carried by a pair of rocker plates 228 pivotally suspended from the pin 206 alongside of the rocker plates 205. The rocker plates 228 also carry a follower roller 229 cooperating with a cam surface 230 formed on the underside of a cam element 231 that is operatively associated with the valve lever 146. The cam surface 230 is positioned to ride on the follower roller 229 and is disposed at an angle to the path defined by the roller as the rocker plates 228 swing on their pivot in response to movements of the cam 226. The central portions of the rocker plates 228 are, of course, cut away to accommodate the shaft 221.

The position control lever 225 is secured to a sleeve 232 journalled on the shaft 221 and also extending from a position outside of the housing 101 to a point within the housing adjacent the rocker plates 228. A cam engaging roller 233 is mounted eccentrically of the sleeve 232 on a support plate 234 so as to coact with a cam surface formed on the upper edge of the cam element 231 adjacent its rear end. The roller 233 is angularly positioned with respect to the sleeve 232 so that swinging the position control lever 225 counterclockwise as seen in FIG. 7 causes the roller 233 to engage the cam element 231 and urge it downwardly, whereupon the interengagement of the cam surface 230 with the follower roller 229 pulls the cam element 231 rearwardly of the tractor.

The cam 231 is pivoted on a shaft 236 secured to an arm 237 that is pivoted freely on the sleeve 147 that rotatably supports the lever 146 (see also FIGS. 14-17). The arm 237 swings adjacent the upper end of the lever 146 and is formed with fingers 238 that embrace the forward edge of the lever 146. Preferably, the upper one of the fingers 238 threadably supports a set screw 239 that provides a settable abutment between the arm 237 and the lever 146. A lock nut 240 is adapted to hold the set screw 239 in adjusted position. Rearward movement of the cam element 231 thus swings the arm 237 counterclockwise until the screw 239 abuts the upper edge of the lever 146, whereupon the lever 146 is rotated incident to further rearward movement of the cam element 231. The slot 216 in the draft cam element 215 constitutes a lost motion connection between the draft cam element and the lever 146 permitting movement of the latter lever under the influence of the position cam element 231 without affecting the draft cam element 215. Conversely, the independent pivoting of the arm 237 allows the draft cam element 215 to swing the lever 146 away from the abutment set screw 239 without interfering with the position of the position cam element 231.

In short, both the draft cam element 215 and the position cam element 231 and of course their associated linkages 40a, and 41a, have independent one-way connections with the valve control lever 146.

It can now be seen that the downward swinging and rearward movement of the cam element 231 resulting from rotating the transport lever 225 counterclockwise is effective to swing the arm 237 counterclockwise so as to pull the lever 146 in that same direction and thus shift the main valve plunger 115 toward the left and its exhaust position. This results in lowering of the hitch linkage as previously explained.

As the hitch linkage descends, the cam 226 swings the roller 227 and the rocker plates 228 forwardly, allowing the cam element 231 to return to its neutral position and the valve plunger 115 to be pulled by its control spring 125 back to its neutral or fluid blocking position. The elements of the position control linkage 41a are proportioned and positioned so that the main valve plunger 115 is brought into neutral position as the hitch linkage attains a position corresponding to that to which the control lever 225 has been swung. It will be evident that the lever 225, in effect, varies the effective length of the motion transmitting linkage between the position cam 226 and the valve plunger of the main valve so as to determine the position to which the hitch linkage must be moved to return the main valve to neutral position.

The cooperating cam surfaces and followers in the linkage 41a are yieldably held in engagement by springs including a coiled compression spring 245 that encircles a rod 246 pivotally connected by a pin 247 to the lower ends of the rocker plates 228 and slidably received in an aperture formed in the bracket 210. The spring 245 thus urges the roller 227 against the face of the cam 226. A second spring 231A is tensioned between the cam element 231 and the upper portion of the rocker plates 228 so as to hold the cam element in yieldable engagement with the cam follower roller 233 on the position lever sleeve 232.

Preferably, the control levers 220 and 225 swing adjacent respective quadrant plates 248 and 249, the levers being between the plates 248, 249 as shown in FIG. 6. A positionable stop 250 is mounted in an arcuate groove in the plate 248 so as to provide a convenient position indicating adjunct for the operator in setting the draft control lever 220. A positionable stop 251 is mounted in a corresponding slot formed in the quadrant plate 249 so as to readily establish the upright or transport position of the position control lever 225.

*Pressure control*

The novel hydraulic control system of the present invention also includes a pressure control linkage 43a capable of shifting the main valve plunger 115 toward discharge independently of the previously described draft control linkage 40a and position control linkage 41a. For this purpose, the pressure control linkage 43a includes a pressure control valve 261 responsive alternatively to the fluid pressure in the main actuator 21 or the auxiliary actuator 38, depending on the setting of the valves 31, 32. The pressure control valve 261 regulates the delivery of pressure fluid to a pressure servo 262 having a one-way connection with the main valve plunger 115 for shifting it in opposition to the bias of the spring 125.

In the illustrated embodiment, the pressure servo 262 includes a cylinder 263 in which a flexible diaphragm 264 is mounted so as to divide the cylinder into two chambers 265 and 266. The diaphragm provides a fluid-tight separation between the two chambers 265, 266 and yet, is flexible enough to permit the enlargement of chamber 265 upon the admission of pressure fluid thereto. The one-way connection between the servo 262 and the main valve 30a is defined by a rod 267 secured at one end to the diaphragm 264 and with the other end extending outwardly through an aperture 268 defined by the housing of the cylinder 263 into engagement with the end of an adjusting screw 269 carried by the lever 146. Preferably, the connection between the diaphragm 264 and the rod 267 is effected by means of a pair of plates 271 and 272 carried by the rod 267 so as to sandwich the diaphragm. A spring 273 compressed between the plate 272 and an end wall 274 of the chamber 266 urges the diaphragm 264 and rod 267 toward the left, as seen in FIG. 9, and thus into its inactive position.

The admission of fluid under pressure through a passage 275 from the pressure control valve 261 to the chamber 265 urges the diaphragm 264 and the rod 267 to the right so as to swing the valve lever 140 into neutral position, wherein the main valve element 115 is shifted from its intake to its neutral or holding position. In other words, activation of the servo 262 by the pressure responsive control valve 261 is effective to cut off the flow of pressure fluid to the actuator 21 or auxiliary actuator 38 by closing the main valve 30a. It will be readily apparent that the rod 267 can pull away from the adjusting screw 269 when the spring 273 returns the rod to its left-hand or non-activated position so that the pressure control linkage 43a does not interfere with operation of the draft control linkage 40a or the position control linkage 41a. In this regard, it will also be apparent that the adjusting screw 269 regulates the effective length of the pressure control linkage 43a by locating the point at which the rod 267 will operate on the lever 146.

The pressure control valve 261 includes a stack of sleeves mounted in the valve body to define a pressure chamber 281, coupled by a passage 282 to the passage 121 which leads to the main control valve 30a on the actuators 21a, 38 and a servo chamber 283 connected by the passage 275 to the servo 262. Communication between the chambers 281, 283 is normally blocked by a slidable, finely finished valve element 284 having a slotted end 285 which is urged against a stem 286 of a cap 287 by a spring 288. The spring 288 is positioned in a sleeve 289 threaded into the valve body and the lower end of the spring is seated on a T-plug 290 that biases the valve element 284 through a spacer 291.

Pressure in the chamber 281 exerts a lifting force on the valve element 284 and, when the force of the spring 288 is exceeded, the element 284 lifts and its slotted end 285 allows fluid to pass from the chamber 281 into the chamber 283 so as to activate the servo 262.

A relief valve 295 (see FIG. 10) is also formed in the valve body for both protecting the servo 262 and for limiting the actuator pressure by bleeding off excess fluid. The valve 295 includes a blocking element 296 biased by a spring 297 toward a normal position closing an exhaust passage 298 which communicates with the passage 275. The spring 297 is selected to allow the element 296 to shift at a pressure slightly higher than the maximum pressure at which the valve 261 opens. It will be readily seen that upon opening of the pressure control valve 261 and actuation of the servo 262, fluid in the actuators 21a at a greater pressure than that for which the relief valve 295 is set will be relieved through the relief valve. This protects the servo 262 and also releases fluid from the actuators 21a when a greater than maximum desirable pressure is reached.

It can also be noted that the pressure control linkage 43a constitutes a form of safety or shock relief mechanism for the control system. A sudden increase of force exerted on the actuator 21a resulting in a surge of additional pressure in the fluid system will open the valve 261, shift the main control valve to holding position so as to prevent additional fluid from the pump 26a being added to the system, and also open the relief valve 295 so as to reduce the pressure in the actuators.

To provide for rapid deactivation and recovery of the pressure control linkage 43a, the pressure control valve 261 is formed with an exhaust passage 300 and the valve element 284 has a tapered end 301 which opens the exhaust passage 300 to the servo passage 283 when the valve element 284 returns under the force of the spring 288 against the stop stem 286. Thus, as soon as the valve opening pressure in the chamber 281 is reduced, the spring 288 returns the valve element 284 against the stem 286 so that the tapered end 301 of the valve element places the servo passage 275 in communication with the exhaust passage 300. The servo spring 273 can then easily exhaust fluid from the servo chamber 265 through the passage 275 and the servo quickly returns to its non-activated condition. The linkage 43a is thus immediately restored for further proper operation and this rapid recovery of the servo 262 permits immediate response by the control system to the alternate controlling linkages 40a and 41a.

For setting the pressure at which the valve 261 opens to actuate the servo 262, the upper end of the valve spring 288 bears against a T-bolt 303 which is threaded into a clevis 304 pivoted on the end of a pressure control lever 305. A lock nut 306 on the bolt 303 sets the threaded adjustment between the bolt and the lever 305. The lever 305 is pivoted on a pin 306a secured to a mounting plate 307 in the tractor housing. A follower roller 308 carried by an arm 309 formed on the lever 305 engages a pressure control cam surface 310 defined on the plate 234. As previously described, the plate 234 is rigidly secured to the sleeve 232 on which the lever 225 is secured.

It will be readily seen that the angular disposition of the cam plate 234 controls the angle at which the lever 305 is stopped under the upward force exerted by the pressure control valve spring 288. By swinging the lever 225 in the pressure control range shown in FIG. 5, the force exerted by the valve spring 288 can be varied and this, of course, permits a selection of pressures at which the valve 261 opens to actuate the servo 262. When the lever 225 is in the straight-up position, the maximum pressure setting for the valve 261 is obtained. Rotation of the lever 225 and the plate 234 in a clockwise direction from the straight-up position allows the lever 305 to reduce the force exerted by the spring 288 and, hence, lower the pressure at which the pressure responsive valve 261 opens. Rotation of the lever 225 and the cam plate 234 in a counterclockwise direction from the straight-up position maintains the valve 261 at the maximum pressure setting during operation of the hydraulic system in the position control range of the lever 225.

Summary

It can now be readily seen that the embodiment shown in FIG. 5 et seq. performs and possesses the advantages of the control system 25 previously discussed in connection with FIGS. 1–4. Furthermore, those skilled in the art will appreciate that the control system embodiment illustrated in FIG. 5 et seq. is particularly well suited for commercial manufacture in that its parts are simply and economically formed and well suited for convenient initial assembly and adjustment. In addition, the system is mechanically straightforward and reliable.

I claim as my invention:

1. In a tractor having a hitch linkage and hydraulic actuator for lifting said linkage upon admission of fluid under pressure to said actuator, a control system comprising, in combination, a source of fluid under pressure including a control valve arranged to direct fluid to and from said actuator, a draft control linkage coupling said hitch linkage and said valve for discharging fluid from said actuator upon a decrease from a predetermined draft load on said hitch linkage, a position control linkage coupling said hitch linkage and said valve for stopping the addition of fluid to said actuator when the hitch linkage reaches a predetermined height, and a pressure control linkage including means for sensing the fluid pressure in said actuator connected to said valve for stopping the addition of fluid to said actuator when a predetermined pressure is exceeded, said draft control linkage, position control linkage and pressure control linkage each being effective to take over and override the others for stopping the addition of fluid to said actuator when a corresponding one of said predetermined load, height or pressure conditions is reached.

2. The combination of claim 1 including pressure relief means coupled to said pressure control linkage for discharging from said actuator fluid pressure in excess of said predetermined pressure so that the load on said linkage does not exceed a predetermined amount.

3. In a control system for a tractor having a hitch lifting arm driven in a lifting direction by directing fluid from a source of fluid under pressure to a hydraulic actuator coupled to said arm, the combination comprising, a control valve arranged to direct fluid to and from said actuator, said valve having supply, discharge and neutral positions for, respectively, raising, lowering and locking said arm, means biasing said valve toward supply position, a position feedback linkage coupling said arm and said valve for moving said valve toward discharge position upon lifting movement of the arm from a pre-set position, a draft control linkage coupling said hitch and said valve for moving said valve toward discharge position upon a decrease from a pre-set draft load on said hitch, a pressure control linkage including means for sensing the fluid pressure in said actuator and moving said valve toward discharge position when a pre-set pressure is reached, and said feedback linkage, draft control linkage and pressure control linkage all having one-way connections with said valve so that each linkage can take over from or override the others in moving the valve toward discharge position when a corresponding one of said pre-set position, draft or pressure conditions is reached.

4. The combination of claim 3 in which the one-way connection for the pressure control linkage includes a flexible diaphragm for moving said valve toward discharge when said diaphragm is acted upon by fluid at said set pressure.

5. The combination of claim 3 including first and second hand operated levers, means including said first lever for selectively varying the effective length of said feedback linkage so as to permit selection of the arm position at which said valve is balanced in neutral, means including said second lever for selectively varying the effective length of said draft control linkage so as to permit selection of the draft load at which valve is balanced in neutral, and means including said first lever for varying said set pressure so as to permit selection of the fluid pressure at which said valve is balanced in neutral.

6. In a control system for a tractor having an implement control member driven in a lifting direction by directing fluid from a source of fluid under pressure to a hydraulic actuator coupled to said member, the combination comprising, a control valve arranged to direct fluid to and from said actuator, said valve having supply, discharge and neutral positions for, respectively, raising, lowering, and locking said member, a position feedback linkage coupling said member and said valve for moving said valve toward discharge position upon lifting movement of the member, a pressure control linkage including means for sensing the fluid pressure in said actuator and moving said valve toward neutral position when a set pressure is reached, a hand operated lever positionable between opposite limit positions, and means including said lever for selectively varying the effective length of said feedback linkage so as to permit selection of the arm position at which said valve is balanced in neutral and for varying said set pressure so as to permit selection of the fluid pressure at which said valve is balanced in neutral.

7. The combination of claim 6 in which the lowest position setting is obtained with said lever in one limit position and the highest position setting is obtained with the lever swung from said one limit position through a portion of the total range of lever movement, the lowest pressure setting being obtained with said lever in the limit position opposite said one limit position and the highest pressure setting being with said lever swung from said opposite limit position through a portion of the total range of lever movement, said lever having a direct valve controlling range intermediate said portions of the total range of lever movement.

8. In a control system for a tractor having an implement control member driven in a lifting direction by directing fluid from a source of fluid under pressure to a hydraulic actuator coupled to said member, the combination comprising, a control valve arranged to direct fluid to and from said actuator, said valve having supply, discharge and neutral positions for, respectively, raising, lowering and locking said member, a pressure control linkage including means for sensing the fluid pressure in said actuator connected to said valve for stopping the addition of fluid to said actuator when a predetermined pressure is reached, a hand operated lever movable in opposite directions from a maximum pressure position, means including said lever for operating said valve between said discharge, neutral and supply positions, respectively, when said lever is progressively moved in one direction from said maximum pressure position to permit visual control of fluid to and from said actuator, and means including said lever for progressively decreasing said predetermined pressure when said lever is progressively moved into the direction opposite to said one direction from said maximum pressure position to provide selective control of fluid pressure in said actuator.

9. The combination of claim 8 including pressure relief means coupled to said pressure control linkage for discharging from said actuator fluid pressure in excess of said selectively predetermined pressure so that the load lifted by said member is maintained at a preselected uniform value.

10. The combination of claim 8 wherein said pressure control linkage has a one-way connection with said valve, and said one-way connection includes a flexible diaphragm for moving said valve toward discharge when said diaphragm is acted upon by fluid at said predetermined pressure.

References Cited by the Examiner

UNITED STATES PATENTS

| Re. 21,892 | 9/1941 | Hogg | 137—100 X |
| 2,998,851 | 9/1961 | Marindin | 172—9 |
| 3,125,168 | 3/1964 | Seguenot | 172—9 X |

ABRAHAM G. STONE, *Primary Examiner.*

R. L. HOLLISTER, *Assistant Examiner.*